United States Patent [19]

Watanabe et al.

[11] Patent Number: 4,603,047
[45] Date of Patent: Jul. 29, 1986

[54] FLAKY PIGMENTS, PROCESS FOR THEIR PREPARATION

[75] Inventors: Takaji Watanabe, Oomiya; Tamio Noguchi, Atsugi, both of Japan

[73] Assignee: Merck Patent Gesellschaft mit beschrankter Haftung, Darmstadt, Fed. Rep. of Germany

[21] Appl. No.: 663,733

[22] Filed: Oct. 22, 1984

[30] Foreign Application Priority Data

Oct. 21, 1983 [JP] Japan .................................. 58-196114
Oct. 21, 1983 [JP] Japan .................................. 58-196115

[51] Int. Cl.$^4$ .............................................. A61K 7/021
[52] U.S. Cl. ...................................... 424/63; 106/291; 106/308 B; 424/69
[58] Field of Search .................... 106/291, 288, 308 B; 424/63, 69

[56] References Cited

U.S. PATENT DOCUMENTS

| | | | |
|---|---|---|---|
| 3,008,844 | 11/1961 | Grunin | 106/291 |
| 4,134,776 | 1/1979 | Rieger et al. | 106/291 |
| 4,146,403 | 3/1979 | Armanini | 106/291 |
| 4,435,220 | 3/1984 | Watanabe et al. | 106/291 |
| 4,509,988 | 4/1985 | Bernhard | 106/291 |

FOREIGN PATENT DOCUMENTS 960639 6/1964 United Kingdom .

OTHER PUBLICATIONS

Chem. Abst. 61:7230h, Georgia Kaolin; Jun. 1964.

Primary Examiner—Theodore Morris
Attorney, Agent, or Firm—Millen & White

[57] ABSTRACT

Flaky pigments, in which a flaky substrate, such as in particular mica, talc or kaolin, are provided with a firmly adhering coating of barium sulphate, if appropriate together with a metal oxide, hydrated metal oxide or metal carbonate, are advantageously used in cosmetics.

16 Claims, No Drawings

FLAKY PIGMENTS, PROCESS FOR THEIR PREPARATION

BACKGROUND OF THE INVENTION

This invention relates to flaky pigments which can be used in cosmetics.

It is known to use flaky powders, such as, for example, mica, e.g., muscovite or sericite, or clay materials, such as kaolin or talc, as the starting material for the preparation of facial powders useful in cosmetics. Since these pigments by themselves do not possess the necessary adhesion and extension properties when used on the skin, when used for the preparation of face powders they are conventionally also mixed with titanium dioxide, metal soaps and calcium carbonate.

SUMMARY OF THE INVENTION

Accordingly, it is an object of this invention to markedly improve the properties of the hitherto customary pigments with respect to adhesion capacity and extension on the skin and also with respect to gloss and transparency, e.g., by coating of the flaky substrates.

Upon further study of the specification and appended claims, further objects and advantages of this invention will become apparent to those skilled in the art.

These objects have been achieved and this invention therefore relates to flaky pigments which are characterized in that a flaky substrate is provided with a firmly adhering coating of barium sulphate, if appropriate together with a metal oxide, hydrated metal oxide or metal carbonate.

The invention also relates to a process for the preparation of a flaky pigment, which is characterized in that an aqueous suspension of a flaky substrate is treated, simultaneously or successively, with an aqueous solution containing barium ions and with an aqueous solution containing sulphate ions, and the pigments coated with barium sulphate and then separated off, dried and, if appropriate, calcined.

Moreover, the invention relates to the use of these pigments for the preparation of cosmetic agents.

DETAILED DISCUSSION

The starting material used for the preparation of the pigments according to the invention can be mica, such as, for example, muscovite or sericite, talc, kaolin, etc. For coating, this substrate in a particle size of about 1–100 um, preferably 1–50 um, can be suspended in water and, in the simplest case, coated with a layer of barium sulphate. To do this, an aqueous solution containing barium ions as well as an aqueous solution containing sulphate ions are added, either simultaneously or successively, to the aqueous suspension at a temperature of about 5°–100° C., preferably 20°–80° C. Advantageously, the suspension is vigorously stirred during the addition and the solutions are added at such a rate that the precipitated barium sulphate is deposited on the surface of the flaky substrate.

For preparing the solution containing barium ions, all water-soluble barium salts, such as, for example, barium chloride, barium hydroxide, barium nitrate and barium sulphide, are suitable in principle. Because of its advantageous price, ready availability and high purity, barium chloride is preferred. For preparing the solution containing sulphate ions, all soluble sulphates, such as, for example, sodium sulphate, potassium sulphate, magnesium sulphate, sodium bisulphate or potassium bisulphate, as well as sulphuric acid can be used.

The quantities in which the reactants are employed are not in themselves particularly critical. In particular, the quantity of the barium sulphate precipitated onto the substrate can be varied within wide limits, depending on the desired properties with regard to adhesive strength, extension and transparency on the skin.

As a rule, the starting suspensions contain about 10 weight percent of the flaky substrate, and the sulphate solution and the barium salt solution are added thereto as about 5–25 percent by weight solutions. Preferably, the barium salt is used in a quantity of 0.8–0.98 mol per mol of sulphate. After coating with the barium sulphate, the pigment is as a rule separated off, washed with water and dried at about 105°–110° C.

In a further embodiment of the invention, a metal oxide, hydrated metal oxide or metal carbonate is also precipitated on, in addition to the barium sulphate layer, and this additional precipitation can be either colorless or colored. In order to obtain this additional precipitation, a sulphate of a metal, which forms a sparingly soluble oxide, hydrated oxide or carbonate can be selected for the barium sulphate precipitation.

Suitable examples are titanyl sulphate, aluminum sulphate, zinc sulphate and magnesium sulphate for colorless additional precipitations, or iron (II) or iron (III) sulphate, iron ammonium sulphate, chromium sulphate, manganese sulphate or cobalt sulphate for colored additional precipitations. The precipitation can be carried out in such a way that, after the completion of the barium sulphate precipitation, a base or an alkaline carbonate solution is added to the suspension. The base used can, for example, be an aqueous solution of sodium hydroxide, potassium hydroxide, ammonium hydroxide or of a substance which gives ammonium hydroxide in aqueous solution, such as, for example, urea or acetamide. The carbonate used can, for example, be sodium carbonate, potassium carbonate, sodium bicarbonate, potassium bicarbonate, ammonium carbonate or ammonium bicarbonate.

In general, a suspension of about 10 parts of the flaky substrate in about 100 parts of water at about 5°–100° C., in particular about 20°–95° C., is also used in this method, and an about 5–25 percent by weight solution of barium salt and about 1.01–2 mol, relative to the barium salt, of an aqueous metal sulphate solution, for example a titanyl sulphate solution, is added to the suspension.

After completion of the addition, an about 5–25 percent by weight solution of a base or of an alkaline carbonate solution is added with stirring, until the pH value of the suspension has been adjusted to a value of about 3–10, depending on the desired precipitation of a hydrated metal oxide or of a carbonate. As a rule, the product formed is then filtered off, washed, dried at about 105°–110° and, if appropriate, calcined.

If the additional precipitation is carried out in the manner described, the quantity of the additional precipitation is fixed by the quantity of the metal sulphate used. It is also possible, however, not to add the metal selected for the additional precipitation before the precipitation of barium sulphate, but only after the precipitation of barium sulphate. Metal salts, such as, for example, titanium tetrachloride, titanium trichloride, aluminum choride, aluminum nitrate, zinc chloride, zinc nitrate, bismuth oxychloride, magnesium chloride, magnesium nitrate, calcium chloride, iron (II) chloride, iron (III) chloride, iron nitrate, chromium chloride, chromium nitrate, manganese nitrate, cobalt chloride and cobalt nitrate are suitable for this purpose.

These metals are precipitated as the oxide, hydrated oxide or carbonate onto the substrate coated with barium sulphate, and this can be proved by microscopy, electron microscopy and X-ray structural analysis. Examples of metal oxides are titanium dioxide, aluminum oxide, zirconium oxide, zinc oxide, calcium oxide and magnesium oxide. Examples of hydrated oxides are hydrated titanium oxide, hydrated aluminum oxide, hydrated zirconium oxide, zinc hydroxide, calcium hydroxide and magnesium hydroxide. Examples of metal carbonates are magnesium bicarbonate, calcium bicarbonate and zinc bicarbonate.

In this case, the precipitation can be carried out immediately after the precipitation of the barium sulphate, or a pigment coated with barium sulphate can be resuspended in water for the additional precipitation. In every case, an approximately 10 percent by weight suspension is used, to which an about 2–25 percent by weight aqueous base are added at a temperature of about 5°–100° C., preferably about 20°–95°.

In the precipitation of hydrated titanium oxide, for example, it is advantageous to maintain a pH value of 1.8–2.2 during the precipitation. It is a general principle that the pH value of the suspension is adjusted such that, after the end of the reaction, the total metal has been precipitated as the hydrated oxide, oxide or carbonate. Subsequently, the pigment is as a rule separated off, washed, dried and, if appropriate, calcined. During drying and especially during calcining at temperatures of up to 8°–900° C., the corresponding oxides are formed from the hydrated oxides and, at higher temperatures, also from the carbonates.

If desired, the pigments formed can also be colored with colorants, and they can be very advantageously used together with the additives, conventional for this purpose, in face powders and similar preparations.

By using the foregoing procedures or equivalent ones, the desired firmly adhering coating will be achieved, i.e., the coating will remain on the substrate throughout the conventional use lifetime of the pigments.

In general, the amount of barium sulphate in the finally produced flaky pigment can range broadly, e.g., from 10 to 40 weight percent based on the total weight of the pigment, preferably 20 to 30 thereof. Similarly, the amount of the oxide, hydrated oxide or carbonate can range broadly, e.g., from 5 to 30 weight percent based on the total weight of the pigment, preferably 10 to 20 weight percent.

In some cases the additional amount of oxide, hydroxide or carbonate can improve the adhesion of the barium sulphate layer and/or impart some gloss to these low luster pigments. By small amounts of colored metal oxides a shade of color can be imparted to the pigments, which might be attractive for special uses.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentags are by weight.

EXAMPLE 1

30 g of barium chloride are dissolved at 25° C. in a suspension of 50 g of muscovite mica of a particle size of 1–15 μm in 500 ml of water, and 200 g of a 10 percent weight sodium sulphate solution are added with stirring at a rate of 2.5 ml per minute.

After stirring for a further 20 minutes, the product is filtered off, washed with water, until chloride ions are no longer detectable, and dried for about 8 hours at 105°–110° C. The flake pigment exhibits good properties with respect to extension and adhesion on the skin. By X-ray diffraction and electron-microscopic investigation, it can be shown that fine particles of barium sulphate have been precipitated on the mica surface.

EXAMPLE 2

30 g of barium chloride are dissolved at 25° C. in a suspension of 50 g of muscovite mica of a particle size of 20–60 μm in 500 ml of water, and 200 g of a 10 percent by weight sodium sulphate solution are allowed to run in at a rate of 2.5 ml per minute. After stirring for a further 20 minutes, the product is filtered off, washed with water, until chloride ions are no longer detectable, and dried for about 8 hours at 105°–110° C. The flake pigment exhibits good properties with respect to extension and adhesion on the skin.

EXAMPLE 3

300 ml of a 10 percent by weight barium chloride solution are added at a rate of 3.3 ml per minute and, simultaneously, 200 ml of a 10 percent by weight potassium sulphate solution are added at a rate of 2.5 ml per minute at 60° C. to a suspension of 50 g of muscovite of a particle size of 1–15 μm in 500 ml of water. After stirring for a further 20 minutes, the product is, as in Example 1, filtered off, washed with water and dried for about 8 hours at 105°–110° C. The flake pigment exhibits good properties with respect to extension and adhesion on the skin.

EXAMPLE 4

300 ml of a 10 percent by weight barium chloride solution are added at a rate of 3.3 ml per minute and, simultaneously, 200 ml of a 10 percent by weight magnesium sulphate solution are added at a rate of 2.5 ml per minute at 25° C. to a suspension of 50 g of muscovite mica of a particle size of 1–15 μm in 500 ml of water. The product is filtered, washed and dried as in Example 1. The flake pigment exhibits good properties with respect to extension and adhesion on the skin.

EXAMPLE 5

300 ml of a 10 percent by weight barium chloride solution, the pH value of which has been adjusted to 1.0–2.0 by the addition of concentrated hydrochloric acid, are added at a rate of 3.3 ml per minute and, simultaneously, 200 ml of a 10 percent by weight sodium sulphate solution are added at a rate of 2.5 ml per minute, at 60° C. with stirring, to a suspension of 50 g of sericite mica of a particle size of 1–20 μm in 500 ml of water. After stirring for a further 20 minutes, the product is filtered off, washed and dried as in Example 1. The flake pigment exhibits good properties with respect to extension and adhesion on the skin.

EXAMPLE 6

300 ml of a 10 percent by weight barium chloride solution are added at a rate of 3.3 ml per minute and, simultaneously, 200 ml of a 10 percent by weight sodium sulphate solution are added at a rate of 2.5 ml per minute, at 25° C. with stirring, to a suspension of 50 g of talc of a particle size of 1-20 μm in 500 ml of water. After stirring for a further 20 minutes, the product is filtered off, washed and dried as in Example 1.

The flake pigment exhibits good properties with respect to extension and adhesion on the skin.

EXAMPLE 7

90 ml of a 10 percent by weight aluminum sulphate solution and of a 10 percent by weight sodium hydroxide solution are added at 70° C. to a suspension of 50 g of the pigment, prepared according to Example 1, in 500 ml of water, the pH value of the suspension being maintained in the range 6.0-8.0. 2 g of Rhodamin B are dissolved in this suspension, and 25 ml of a 20 percent by weight solution of tannic acid are then added slowly. Subsequently, to complete the color lake, a 10 percent by weight solution of tartar emetic is added, until the dye has disappeared. After filtering off, washing with water and drying, a pigment corresponding to Example 1 is obtained, which additionally has a coating of a color lake.

EXAMPLE 8

300 ml of a 10 perccent by weight barium chloride solution are added at a rate of 3.3 ml per minute and, simultaneously, 200 ml of a 10 percent by weight potassium sulphate solution are added at a rate of 2.5 ml per minute, at 25° C. with stirring, to a suspension of 50 g of mica of a particle size of 1-15 μm in 500 ml of water. After stirring for a further 20 minutes, the product is filtered off, washed with water and dried as in Example 1. 50 g of the whitish product thus obtained are suspended in 500 g of water, and 280 ml of a 15 percent by weight titanium chloride solution and, simultaneously, of a 10 percent by weight sodium hydroxide solution are added at 70° C. in such a way that the pH value of the suspension is maintained at 1.8-2.0.

The product is then filtered off, washed with water, dried for about 8 hours at 105°-110° C. and calcined for 1 hour at about 800° C. The flake pigment exhibits excellent properties with respect to extension and adhesion on the skin.

EXAMPLE 9

55 g of iron ammonium sulphate, 10 g of magnesium sulphate and 80 g of urea are dissolved in a suspension of 90 g of a mica pigment, coated with barium sulphate as in Example 8, in 900 ml of water. The suspension is then heated to 95°-98° C. and stirred for 1 hour. The product thus formed is filtered off, washed with water and dried for about 8 hours at about 105°-110° C. The flake pigment has a yellow color like hydrated iron oxide and possesses outstanding properties with respect to transparency and gloss as well as good extension and adhesion on the skin.

EXAMPLE 10

The pigment prepared according to Example 9 is calcined for 1 hour at 800° C. This gives a reddish product which, according to X-ray diffraction and electron-microscopic investigation, consists of mica with fine particles of $Fe_2O_3$ and barium sulphate.

EXAMPLE 11

24.4 g of barium chloride are dissolved in a suspension of 50 g of mica of a particle size of 1-15 um in 500 ml of water. 300 ml of a 12 percent by weight titanium sulphate soution are added with stirring to the suspension, heated to 85°-92° C., at a rate of 5 ml per minute, followed by about 150 ml of a 10 percent by weight sodium hydroxide solution to a rate of 5 ml per minute, so that the pH value at the end of the reaction is about 5.6. The product is filterd off, washed with water, dried for about 8 hours at 105°-110° C. and calcined for 1 hour at about 800° C. The adhesion properties of this product are improved as compared with a mica pigment having a barium sulphate coating.

EXAMPLE 12

Simutaneously, 300 ml of a 10 percent by weight barium chloride solution are added at a rate of 3.0 ml per minute and 340 ml of a 10 percent by weight magnesium sulphate solution are added at a rate of 3 ml per minute, with stirring, to a suspension of 50 g of mica of a particle size of 1-15 μm in 500 ml of water. The pH value of the suspension is then adjusted to 8.0 by adding a 10 percent by weight sodium carbonate solution. The product coated with barium sulphate and magnesium carbonate is filtered off, washed with water and dried for about 8 hours at 105°-110° C. It exhibits good extension on the skin.

EXAMPLE 13

200 ml of a 10 percent by weight barium chloride solution are added at a rate of 5 ml per minute and, simultaneously, 250 ml of a 10 percent by weight zinc sulphate solution are added at a rate of 5 ml per minute, at 70° C. with stirring, to a suspension of 50 g of mica of a particle size of 1-15 μm in 500 ml of water. The pH value of the suspension is then adjusted to 8.5 by adding a solution which contains 10 percent by weight of potassum bicarbonate and 10 percent by weight of potassium carbonate.

By filtering off, washing with water, drying at about 105°-110° C. for about 8 hours and calcining at about 650° C. for one hour, a whitish pigment with a coating of barium sulphate and zinc oxide is obtained. The pigment possesses good extension and adhesion.

EXAMPLE 14

300 ml of a 10 percent by weight barium chloride solution are added at a rate of 3 ml per minute and, simultaneously, 400 ml of 10 percent by weight iron ammonium sulphate solution are added at a rate of 4 ml per minute, at 65° C. with stirring, to a suspension of 50 g of mica of a particle size of 1-15 μm in 500 ml of water. The pH value of the suspension is then adjusted to 7.0 by adding a 10 percent by weight potassium hydroxide solution, and the product formed is filtered off, washed with water and dried for about 8 hours at 105°-110° C. This gives a product with a layer of hydrated iron oxide and barium sulphate on mica.

EXAMPLE 15

The yellow pigment prepared according to Example 14 is calcined for 1 hour at about 800° C., a reddish pigment being obtained.

EXAMPLE 16

200 ml of a 10 percent by weight barium chloride solution are added at a rate of 5 ml per minute and, simultaneously, 200 ml of a 10 percent by weight aluminum sulphate solution are added, at 70° C. with stirring, to a suspension of 50 g of mica of a particle size of 1–15 μm in 500 ml of water. The pH value of the suspension is then ajdusted to 7.5 by adding a 10 percent potassium hydroxide solution, and the product formed is filtered off, washed with water and dried for about 8 hours at 105°–110° C. A pigment having a layer of barium sulphate and aluminum hydroxide and possessing good extension and adhesion on the skin is obtained.

EXAMPLE 17

The procedure is analogous to Example 1, but talc having a particle size of 1–20 μm is used in place of mica.

EXAMPLE 18

A compact powder for use in make-up is prepared by mixing the following ingredients:
63.5 parts by weight of the pigment prepared according to Example 1
5.0 parts by weight of a color pigment
8.0 parts by weight of lanolinic acid
4.0 parts by weight of isopropyl myristate
2.5 parts by weight of calcium stearate
17.0 parts by weight of corn starch.

In the cosmetic thus prepared, the pigment according to this invention exhibits better properties with respect to transparency, gloss, extension and adhesion than the mica or talc used according to the state of the art.

EXAMPLE 19

A compact powder for use in make-up is prepared by mixing the following ingredients:
75.0 parts by weight of the pigment according to Example 11
3.0 parts by weight of the colored pigment according to Example 15
2.0 parts by weight of color pigment
3.0 parts by weight of lanolinic acid
3.0 parts by weight of isopropyl myristate
2.0 parts by weight of calcium stearate
12.0 parts by weight of corn starch.

In the cosmetic thus prepared, the pigment according to the invention possesses better properties with respect to transparency, gloss, extension and adhesion than the mica or talc used according to the state of the art.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a powdery cosmetic composition comprising a flaky pigment and at least one other compatible ingredient, the improvement wherein the flaky pigment comprises a flaky pigment substrate having a firmly adhering coating of precipitated barium sulfate, and a metal oxide, hydrated metal ozide or metal carbonate compatible with the end use of the pigment, the amount of barium sulfate being effective to improve the skin adhesion capacity or extension on the skin of the powdery cosmetic composition.

2. A composition of claim 1, wherein the substrate is mica, talc or kaolin.

3. A composition of claim 1 wherein the substrate has a particle size of 1–100 μm.

4. A composition of claim 1 wherein the amount of metal salt is about 1 to 2 moles per mole of barium salt.

5. A composition of claim 1 wherein the oxide, hydrated oxide or carbonate is of titanium, aluminum, zinc, magnesium, iron, chromium, manganese or cobalt.

6. A composition of claim 1 further comprising a compatible colorant.

7. In a facial powder comprising a flaky pigment and at least one other compatible ingredient, the improvement wherein the flaky pigment is that of claim 1.

8. A composition of claim 1, wherein the flaky pigment is prepared by treating an aqueous suspension of the flaky substrate with an aqueous solution containing barium ions and an aqueous solution containing sulfate ions, under conditions in which barium sulfate precipitates, simultaneously or after the precipitation of barium sulfate, also precipitating a metal oxide, hydrated metal oxide or metal carbonate, and then separating the resultant coated pigment.

9. A composition of claim 8, wherein the coated pigment is further dried and calcined.

10. A composition of claim 8, wherein the preparation of the flaky pigment further comprises, after the precipitation of barium sulfate, precipitating a metal oxide, hydrated metal oxide or metal carbonate, by addition of an aqueous base or an aqueous alkaline solution containing carbonate ions.

11. A composition of claim 8, wherein a metal salt of titanium, aluminum, zinc, magnesium, iron, chromium, manganese or cobalt is used for the preparation of the metal oxide, hydrated oxide or carbonate.

12. A composition of claim 10, wherein a metal salt of titanium, aluminum, zinc, magnesium, iron, chromium, manganese or cobalt is used for the precipitation of the metal oxide, hydrated oxide or carbonate.

13. A composition of claim 1, wherein in the preparation of the flaky pigment, the sulfate ions are used in stoichiometric excess over the barium ions.

14. A composition of claim 8, wherein said two aqueous solutions are added to the suspension simultaneously.

15. A composition of claim 8, wherein said two aqueous solutions are added to the suspension successively.

16. A nacreous flaky pigment, comprising a flaky pigment substrate having a firmly adhering coating of barium sulfate, the amount of the latter being effective to improve the skin adhesion capacity or extension on the skin of a cosmetic powder when the flaky pigment is used in the cosmetic powder, and wherein the flaky substrate is mica whose barium sulfate coating also comprises a metal oxide, hydrated metal oxide or metal carbonate compatible with the end use of the pigment, and which renders the pigment nacreous.

* * * * *